(12) United States Patent
Teng

(10) Patent No.: US 6,742,890 B1
(45) Date of Patent: Jun. 1, 2004

(54) MOUNTING STRUCTURE FOR LENSES AND A FRAME OF AN EYEGLASSES

(75) Inventor: Jo-Hsin Teng, Tainan (TW)

(73) Assignee: Megasafe Products, Inc., Tainan (TW)

( * ) Notice: Subject to any disclaimer, the term of this patent is extended or adjusted under 35 U.S.C. 154(b) by 0 days.

(21) Appl. No.: 10/647,349

(22) Filed: Aug. 26, 2003

(51) Int. Cl.⁷ ................................................ G02C 1/00
(52) U.S. Cl. ........................... 351/86; 351/83; 351/103; 351/106
(58) Field of Search .......................... 351/83, 86, 103, 351/106, 110, 108, 41, 158

(56) References Cited

U.S. PATENT DOCUMENTS 6,193,367 B1 * 2/2001 Lee ............................. 351/86
6,196,681 B1 * 3/2001 Canavan ..................... 351/106

* cited by examiner

Primary Examiner—Hung X. Dang
(74) Attorney, Agent, or Firm—Rosenberg, Klein & Lee

(57) ABSTRACT

An eyeglasses includes a lens part, and a frame having a front; the lens part has rearwards extending wings at two ends, and an engaging hole on a middle; each wing has a slot having rear and front sections; the front has a post fitting with the engaging hole, and insertion portions fitting with the slot rear sections on inward sides of two folded ends; stopping portions are formed on the insertion portions, and are shaped such as to be passable through the slot front sections; the stopping portions are longer than the slot rear sections such that the lens can be firmly coupled to the front by means of displacing the lens part rewards relative to the front to insert the post in the engaging hole and fit the insertion portions in respective slot rear sections after the stopping portions have been passed through respective slot front sections.

1 Claim, 5 Drawing Sheets

MOUNTING STRUCTURE FOR LENSES AND A FRAME OF AN EYEGLASSES

BACKGROUND OF THE INVENTION

1. Field of the invention

The present invention relates to a mounting structure for lenses and a frame of an eyeglasses, more particularly one, which allows the lenses to be easily coupled to the frame, and which can effectively prevent the lenses from becoming loose.

2. Brief Description of the Prior Art

People usually wear eyeglasses to correct their vision errors caused by nearsightedness, farsightedness etc, and will also wear safety glasses or sport and leisure glasses to protect their eyes when they are engaged in certain activities.

Referring to FIGS. 5, and 6, a conventional structure for safety glasses and glasses for sport and leisure includes a lens part 3, and a frame, which consists of a front 5, and a pair of temples 4 pivoted to respective ones of two ends of the front 5; the front 5 is formed with receiving rooms 51 for the lens part 3, and a holding trench 52 around the receiving rooms 51; the edge of the lens part 3 is inserted in the holding trench 52 so that the lens part 3 is held in position in the receiving rooms 51.

However, the above mounting structure for the lens part and the frame is found to have disadvantages as followings:
1. The frame can only be connected with those lenses that are made in the shape of the receiving rooms of the front thereof. In other words, the user can't fit lenses of various different shapes to the frame for a change.
2. It takes relatively much material to manufacture the front of the frame because the frame front has to be formed with such an edge as to fit around a lens part. And, the lower edge of the frame front will unnecessarily cover some portions of the user' face under the eyes.
3. It takes skill, carefulness, and more time to fit the lens part 3 in the receiving room of the front 5 of the frame otherwise either the lens part 3 or the frame front 5 will be damaged.
4. In order for allowing the lens part 3 to be more easily fitted in the front 5, the holding trench 52 is usually made such that there will be space between it and the edge of the lens part 3 after mounting. Consequently, the lens part 3 is not firm enough, and can possibly fall off after the eyeglasses have been slightly deformed after extended period of time of use.
5. The front 5 is relatively thick as compared with the lens part 3, and is likely to cause discomfort to the wearer. The whole glasses can't be used any longer once either one of the lens part and the front is damaged while there is higher possibility of safety glasses getting damaged.

SUMMARY OF THE INVENTION

It is a main object of the present invention to provide a mounting structure for lenses and a frame of an eyeglasses that will overcome the above disadvantages.

The eyeglasses according to the present invention include a lens part having left-eye and right-eye parts connected together, and a frame having a front and temples pivoted to the front. The lens part has rearwards extending wings at two ends, and an engaging hole on a middle of a nosepiece thereof. Each wing has a slot having rear and front sections. The front of the frame has a post fitting with the engaging hole, and insertion portions, which are formed on inward sides of two folded ends, and which fit with the slot rear sections; stopping portions are formed on the insertion portions, and are shaped such as to be capable of being through the slot front sections. The stopping portions are longer than the slot rear sections. Thus, the lens can be firmly coupled to the front of the frame by means of displacing the lens part rewards relative to the front to insert the post in the engaging hole and at the same time fit the insertion portions in respective slot rear sections after the stopping portions have been passed through respective slot front sections.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
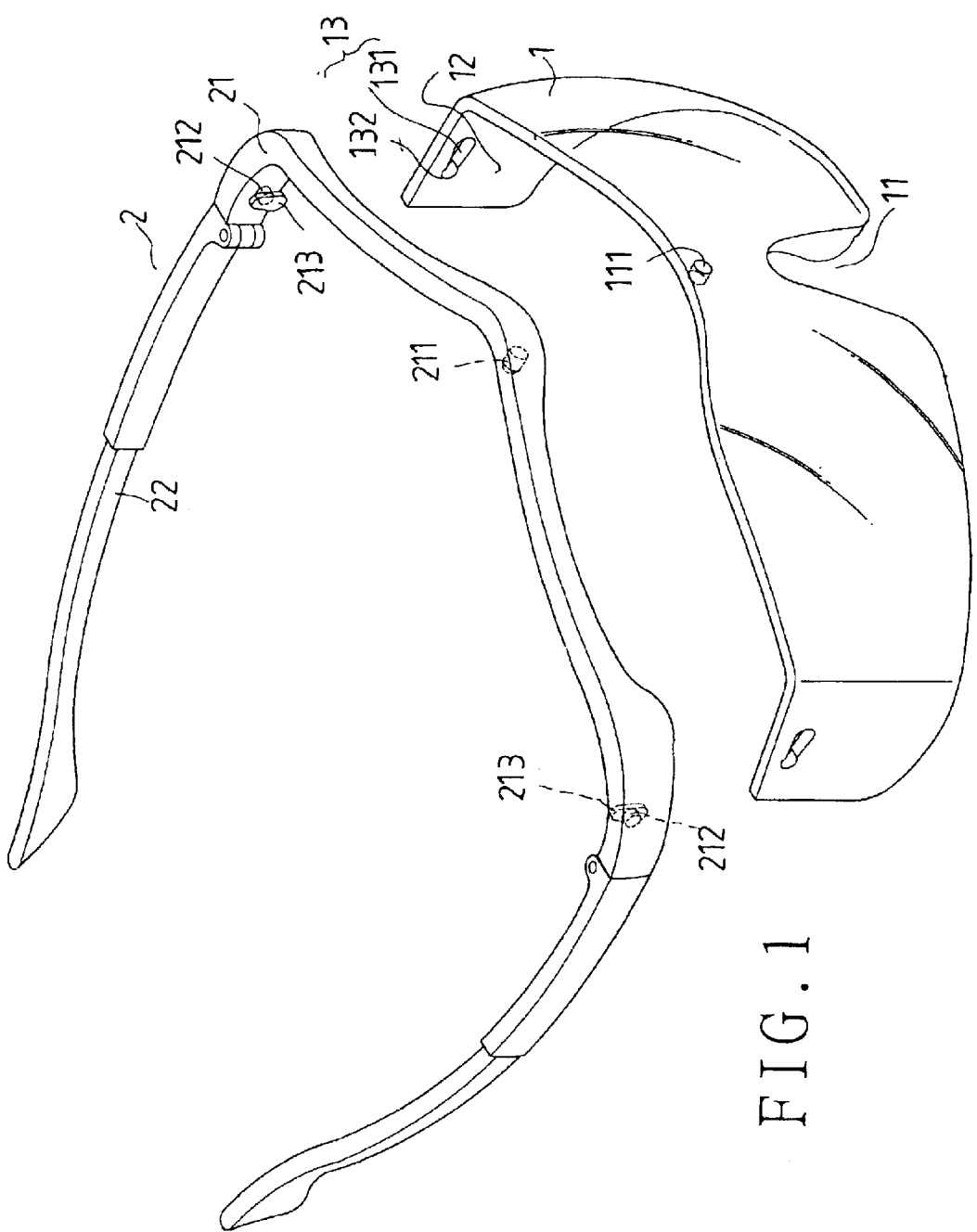
FIG. 1 is an exploded perspective view of the eyeglasses according to the present invention.

Referring to FIG. 1, a preferred embodiment of an eyeglasses in the present invention includes a lens 1, and a frame 2. The lens 1 is made with a left-eye and a right-eye parts being connected together, and has a nosepiece 11 between the left-eye and the right-eye parts at a middle portion. The frame 2 is comprised of a front part 21 having two rearwards folded ends, and a pair of temples 22 pivoted to respective ones of the folded ends of the front part 21.

Moreover, the lens 1 has lateral wing portions 12 extending substantially rearwards from outward ends of the left-eye part and the right-eye part thereof, an engaging hole 111 on the nosepiece 11. Each of the lateral wing portions 12 is formed with a substantially horizontal connecting slot 13 thereon, which slot 13 is comprised of an elongated receiving section 131 at a front end, and a locating section 132 at a rear end thereof; the receiving section 131 tapers off towards a rear end thereof.

The front part 21 of the frame 2 has an engaging post 211 projecting rearwards from a middle thereof, and a lateral engaging part on an inward side of each of the folded ends thereof, which lateral engaging part includes an insertion portion 212 projecting from the folded end, and a substantially upright stopping portion 213 connected to the insertion portion 212; the stopping portions 213 are made to have substantially the same shape as the front elongated receiving sections 131 of the connecting slots 13, and can pass through the receiving sections 131; the insertion portions 212 are formed such as to be capable of tightly fitting in the rear locating sections 132 of the connecting slots 13; the engaging post 211 is formed such as to be capable of tightly fitting in the engaging hole 111 of the lens 1.

Figure 2:
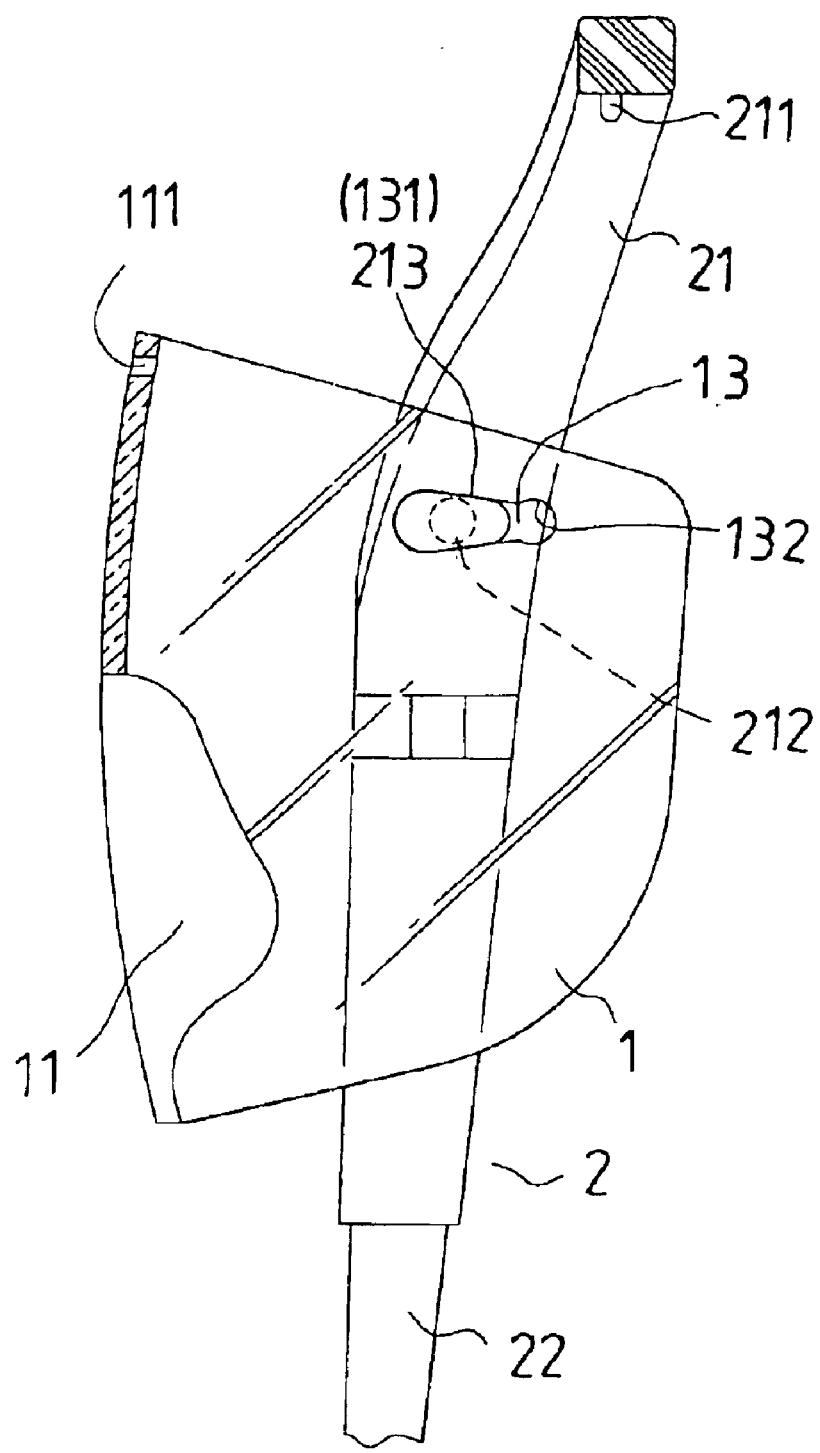
FIG. 2 is a side view of the eyeglasses of the present invention under a first step of assembly.
Figure 4:
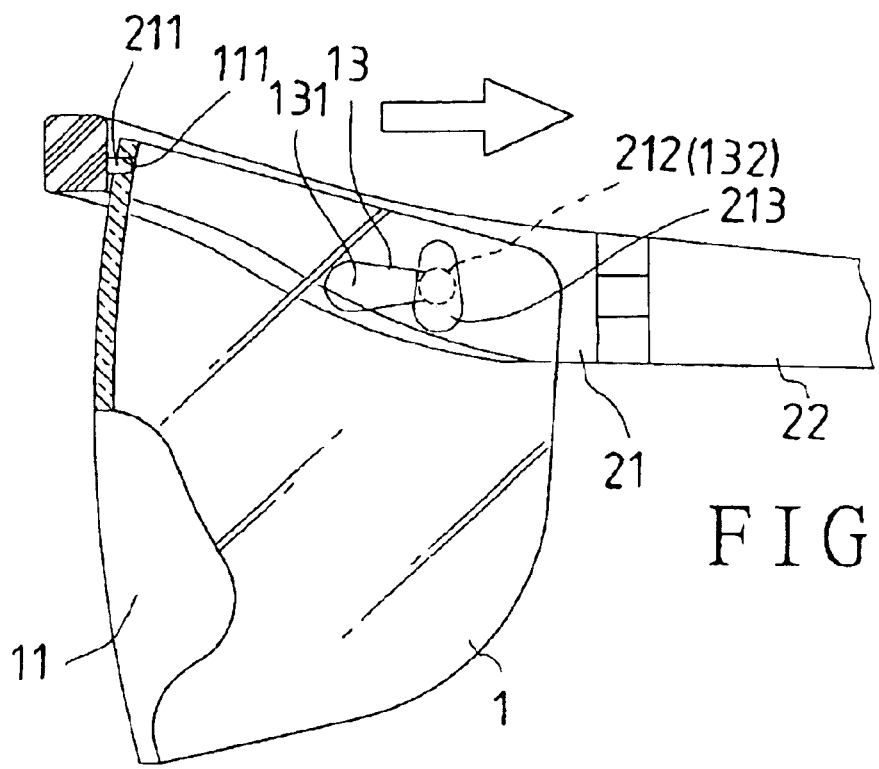
FIG. 4 is a side view of the eyeglasses of the present invention under a third step of assembly.
Figure 3:
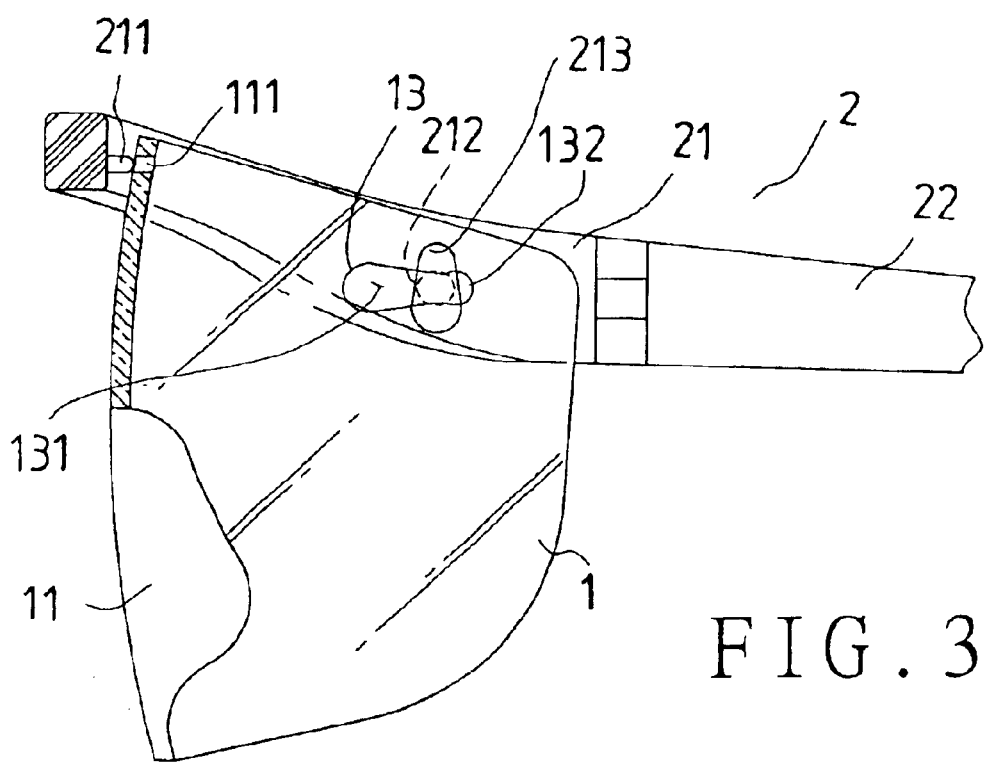
FIG. 3 is a side view of the eyeglasses of the present invention under a second step of assembly.
Figure 5:
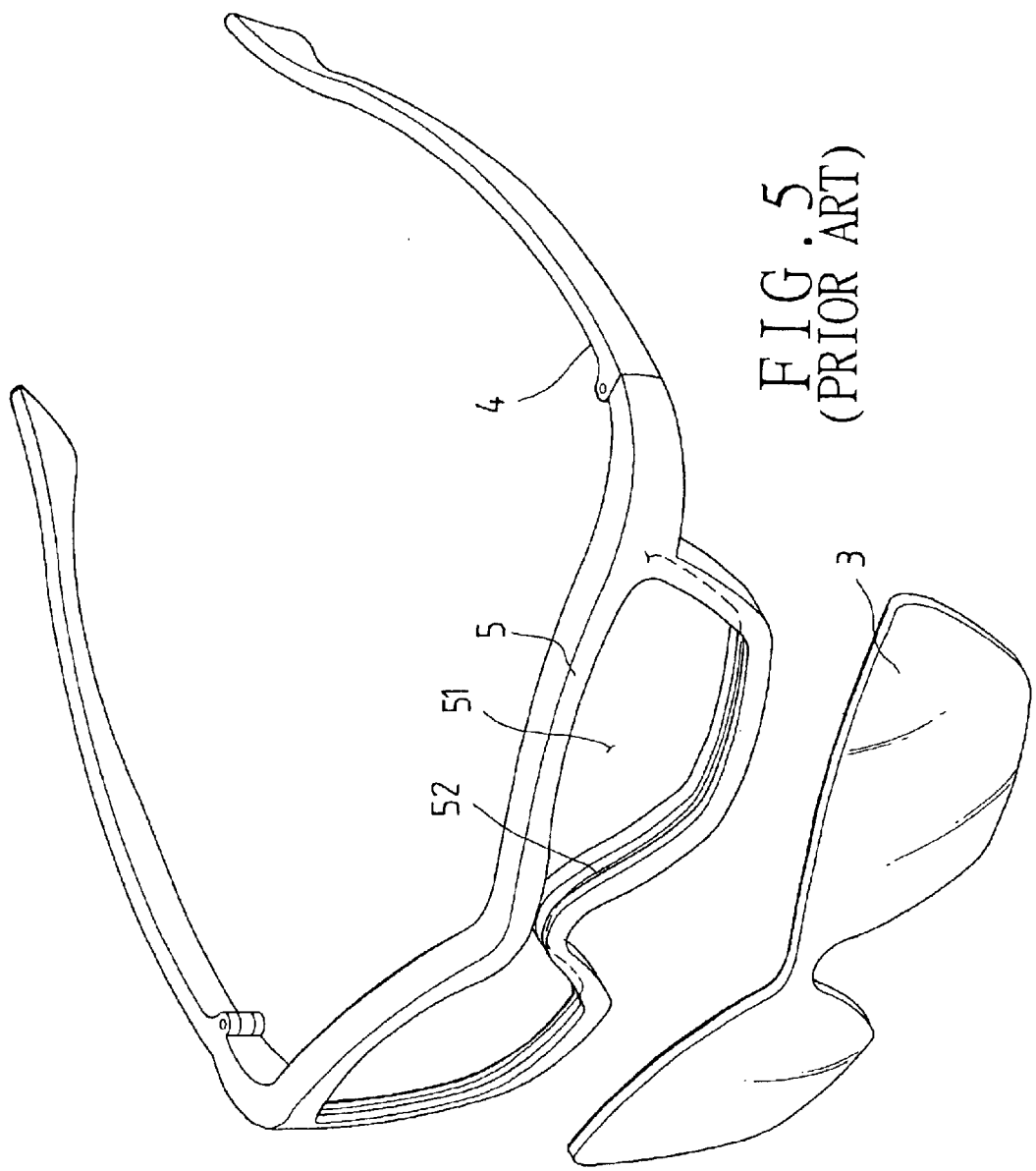
FIG. 5 is an exploded perspective view of the conventional eyeglasses as described in the Background.
Figure 6:
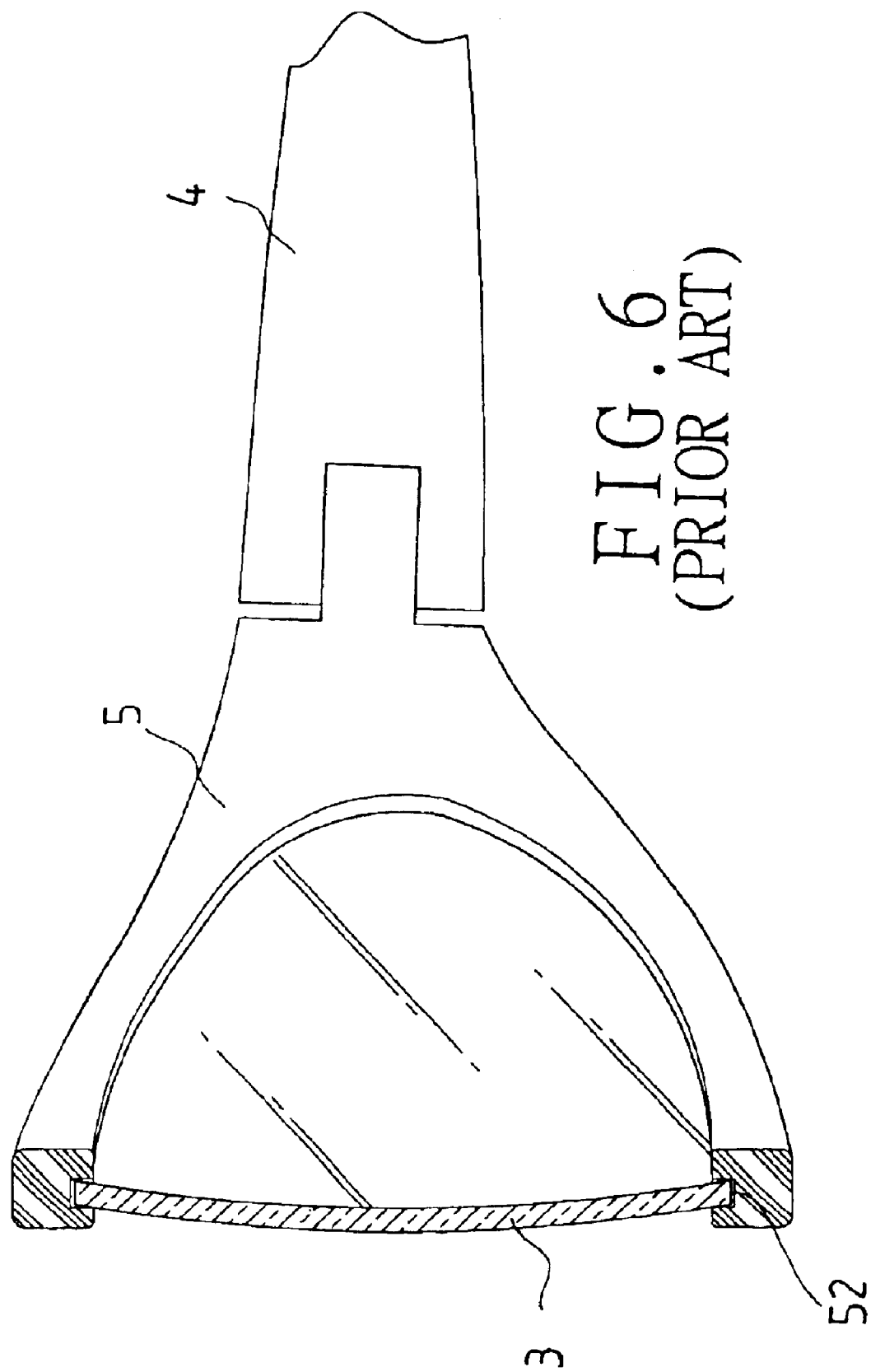
FIG. 6 is a partial section of the conventional eyeglasses.

In combination, referring to FIGS. 2 to 4, the frame 2 is positioned upright, and the lens 1 are positioned such that the lateral wing portions 12 oppose the inward sides of the folded ends of the front part 21, and such that the front elongated receiving sections 131 of the connecting slots 13 oppose respective ones of the stopping portions 213 of the lateral engaging parts of the frame 2. Then, the stopping portions 213 are passed through the elongated receiving sections 131 of the connecting slots 13 with the insertion portions 212 being held in the elongated receiving sections 131. And, the frame 2 is pivoted on the insertion portions 212 to become horizontal, as shown in FIG. 3. Finally, the frame 2 is displaced rearwards relative to the lens 1 such that the engaging post 211 is tightly inserted in the engaging hole 111, and at the same time the insertion portions 212 are closely fitted in respective ones of the rear locating sections 132 of the connecting slots 13, as shown in FIG. 4; thus, the lens 1 is coupled to the frame 2.

From the above description, it can be easily understood that the eyeglasses of the present invention has advantages as followings:

The frame can be connected with lenses of such kind in different colors and shapes according to the present mounting structure. In other words, the user can fit various different lenses to the frame for a change. And, it takes less material to manufacture the front part 21, and there is no lower edge of the front part 21 to unnecessarily cover the user's face. And, it is relatively easy to fit the lens 1 to the front part 21 of the frame 2, and the lens 1 will be more firmly held in position than the above conventional one. Moreover, when one of the frame 2 and the lens 1 is damaged, the user can easily replace it with a new one, and doesn't have to discard the whole eyeglasses.

What is claimed is:

1. A mounting structure for a lens and a frame of an eyeglasses, the lens being made with a left-eye and a right-eye parts being connected together, and having a nosepiece at a middle portion thereof;

the frame having a front part for connection with the lens, and a pair of temples pivoted to two ends of the front part; the front part being rearwards folded at the two ends;

the lens having lateral wing portions substantially extending rearwards from two ends; the lens having an engaging hole on the nosepiece; each of the lateral wing portions being formed with a connecting slot comprised of an elongated receiving section at a front end, and a locating section at a rear end; each of the receiving sections tapering off towards a rear end thereof;

the front part of the frame having an engaging post projecting rearwards from a middle thereof; the front part having lateral engaging parts formed on inward sides of the folded ends thereof; each of the lateral engaging parts having an insertion portion on corresponding folded end of the front part, and a stopping portion connected to the insertion portion; the stopping portions being formed passable through the front elongated receiving sections of the connecting slots when the frame is positioned substantially upright; the stopping portions being formed at least slightly longer than the rear locating sections of the connecting slots; the insertion portions being formed to fit with the rear locating sections; the engaging post being formed to fit with the engaging hole of the lens;

the lens being coupled to the front part of the frame by means of inserting the engaging post in the engaging hole as well as fitting the insertion portions in respective rear locating sections of the slots after the frame is angularly displaced relative to the lens to make the engaging post oppose the engaging hole after the stopping portions have been passed through respective front elongated receiving sections of the connecting slots of the lens.

* * * * *